(12) United States Patent
Jung et al.

(10) Patent No.: US 9,915,766 B2
(45) Date of Patent: Mar. 13, 2018

(54) THIN POLARIZER WITH EXCELLENT OPTICAL PROPERTIES, MANUFACTURING METHOD THEREFOR AND POLARIZING PLATE INCLUDING SAME

(71) Applicant: LG CHEM, LTD., Seoul (KR)

(72) Inventors: Jong-Hyun Jung, Daejeon (KR); Sung-Hyun Nam, Daejeon (KR); Kyun-Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/107,283

(22) PCT Filed: Sep. 23, 2014

(86) PCT No.: PCT/KR2014/008841
§ 371 (c)(1),
(2) Date: Jun. 22, 2016

(87) PCT Pub. No.: WO2015/099267
PCT Pub. Date: Jul. 2, 2015

(65) Prior Publication Data
US 2017/0003427 A1    Jan. 5, 2017

(30) Foreign Application Priority Data

Dec. 27, 2013 (KR) ........................ 10-2013-0165197
Sep. 17, 2014 (KR) ........................ 10-2014-0123602

(51) Int. Cl.
*G02B 5/30* (2006.01)
*B29D 11/00* (2006.01)
(Continued)

(52) U.S. Cl.
CPC ...... *G02B 5/3033* (2013.01); *B29D 11/00644* (2013.01); *B29D 11/00894* (2013.01);
(Continued)

(58) Field of Classification Search
CPC ............ G02B 5/3033; B29D 11/00644; B29D 11/00894; B29K 2029/04; B29K 2105/256; G02F 1/133528
(Continued)

(56) References Cited

U.S. PATENT DOCUMENTS 7,221,510 B2 * 5/2007 Mizushima ....... G02F 1/133528
                                                    359/487.02
7,479,312 B2 * 1/2009 Tamagawa ................. C08J 5/18
                                                    349/117
(Continued)

FOREIGN PATENT DOCUMENTS

EP    2613183 A1    7/2013
EP    2672298 A1    12/2013
(Continued)

*Primary Examiner* — Frank Font
(74) *Attorney, Agent, or Firm* — Dentons US LLP

(57) ABSTRACT

The present invention relates to a method of manufacturing a thin polarizer, including: forming a film laminate by attaching a polyvinyl alcohol-based film to at least one surface of a polymer film by using attraction force or an adhesive; swelling the film laminate so that a degree of swelling of the polyvinyl alcohol-based film is 0.36 to 0.44; dyeing at least one of iodine and a dichromatic dye on the film laminate; and stretching the film laminate.

9 Claims, 2 Drawing Sheets

(51) Int. Cl.
  *B29K 29/00* (2006.01)
  *B29K 105/00* (2006.01)
  *B29L 9/00* (2006.01)
(52) U.S. Cl.
  CPC .... *B29K 2029/04* (2013.01); *B29K 2105/256* (2013.01); *B29L 2009/00* (2013.01)
(58) Field of Classification Search
  USPC ........................................ 359/487.02; 349/96
  See application file for complete search history.

(56) References Cited

U.S. PATENT DOCUMENTS

| | | | | |
|---|---|---|---|---|
| 7,767,047 | B2* | 8/2010 | Fujita | B29C 66/939 |
| | | | | 156/182 |
| 8,197,629 | B2* | 6/2012 | Umemoto | B29C 59/16 |
| | | | | 156/247 |
| 8,323,538 | B2* | 12/2012 | Ogomi | G02B 5/3033 |
| | | | | 264/1.31 |
| 9,040,129 | B2* | 5/2015 | Fukagawa | C08J 5/18 |
| | | | | 349/96 |
| 9,138,947 | B2* | 9/2015 | Shigetomi | B29C 55/04 |
| 9,643,387 | B2* | 5/2017 | Nam | G02B 5/3033 |
| 9,662,865 | B2* | 5/2017 | Nam | B32B 27/08 |
| 2004/0212885 | A1* | 10/2004 | Mizushima | G02F 1/133528 |
| | | | | 359/489.15 |
| 2008/0011411 | A1* | 1/2008 | Fujita | B29C 66/7338 |
| | | | | 156/182 |
| 2008/0143928 | A1* | 6/2008 | Fukagawa | B32B 17/10018 |
| | | | | 349/96 |
| 2009/0051058 | A1* | 2/2009 | Ogomi | G02B 5/3033 |
| | | | | 264/1.34 |
| 2009/0231519 | A1* | 9/2009 | Toyama | G02B 5/3083 |
| | | | | 349/96 |
| 2009/0323185 | A1 | 12/2009 | Goto et al. | |
| 2010/0118399 | A1* | 5/2010 | Umemoto | B29C 59/16 |
| | | | | 359/485.01 |
| 2010/0206478 | A1* | 8/2010 | Fujita | B29C 66/939 |
| | | | | 156/324 |
| 2010/0245727 | A1* | 9/2010 | Shigetomi | B29C 55/04 |
| | | | | 349/96 |
| 2011/0273646 | A1* | 11/2011 | Fukagawa | C08J 5/18 |
| | | | | 349/96 |
| 2011/0315306 | A1 | 12/2011 | Goto et al. | |
| 2012/0281279 | A1 | 11/2012 | Goto et al. | |
| 2013/0235299 | A1 | 9/2013 | Nam et al. | |
| 2013/0329289 | A1 | 12/2013 | Haida et al. | |
| 2015/0224746 | A1* | 8/2015 | Nam | B32B 27/08 |
| | | | | 428/424.2 |
| 2016/0016388 | A1* | 1/2016 | Nam | G02B 5/3033 |
| | | | | 428/213 |
| 2016/0084990 | A1* | 3/2016 | Nam | B29D 11/0073 |
| | | | | 428/336 |
| 2016/0243774 | A1* | 8/2016 | Nam | B29D 11/00644 |
| 2017/0157869 | A1* | 6/2017 | Nam | B29D 11/00644 |

FOREIGN PATENT DOCUMENTS

| | | |
|---|---|---|
| JP | 2001-141926 A | 5/2001 |
| JP | 2005-266325 A | 9/2005 |
| JP | 2010-033007 A | 2/2010 |
| JP | 2010-169870 A | 8/2010 |
| JP | 2012-118521 A | 6/2012 |
| JP | 2012-256018 A | 12/2012 |
| JP | 2013-011837 A | 1/2013 |
| JP | 2013-238640 A | 11/2013 |
| JP | 2013-254067 A | 12/2013 |
| KR | 2013-0045065 A | 5/2013 |
| KR | 2013-0116200 A | 10/2013 |
| WO | 2014/024712 A1 | 2/2014 |

* cited by examiner

THIN POLARIZER WITH EXCELLENT OPTICAL PROPERTIES, MANUFACTURING METHOD THEREFOR AND POLARIZING PLATE INCLUDING SAME

This application is a National Stage Entry of International Application No. PCT/KR2014/008841, filed on Sep. 23, 2014, and claims the benefit of and priority to Korean Application No. 10-2013-0165197, filed on Dec. 27, 2013 and Korean Patent Application No. 10-2014-0123602, filed on Sep. 17, 2014, all of which are incorporated herein by reference in their entirety for all purposes as if fully set forth herein.

TECHNICAL FIELD

The present invention relates to a thin polarizer having a thickness of 10 μm or less, a method of manufacturing the same, and a polarizing plate including the same, and more particularly, to a thin polarizer that is thin and has an excellent optical property, a method of manufacturing the same, and a polarizing plate including the same.

BACKGROUND ART

A polarizer used in a polarizing plate is an optical diode for converting natural light or any polarization into polarization in a specific direction, and is extensively used in a display device such as a liquid crystal display and an organic light emitting diode (OLED). Recently, as the polarizer used in the display device, a polyvinyl alcohol-based polarizing film where molecular chains containing an iodine-based compound or a dichromatic dye are aligned in a predetermined direction has been generally used.

The polyvinyl alcohol-based polarizing film is manufactured by a method of dyeing a polyvinyl alcohol-based film with an iodine or dichromatic dye and then performing stretching in a predetermined direction and cross-linking, and in this case, the stretching process may be performed by wet stretching performed in a solution such as a boric acid aqueous solution or an iodine aqueous solution, dry stretching performed under atmosphere, or the like. However, in an existing manufacturing process as described above, in order to perform stretching without occurrence of breakage, a thickness of the polyvinyl alcohol-based film before stretching needs to exceed 60 μm. This is because in the case where the thickness of the polyvinyl alcohol-based film before stretching is 60 μm or less, the degree of swelling of the polyvinyl alcohol-based film is increased and a modulus acted per unit area in the stretching process is increased due to the small thickness which easily causes breakage.

Meanwhile, in accordance with a recent trend of reducing a thickness of the display devices, the polarizing plate needs to have a smaller thickness. However, like the related art, in the case where the polyvinyl alcohol-based film having the thickness before stretching exceeding 60 μm is used, there is a limit in reducing the thickness of the polarizer. Accordingly, research for manufacturing the polarizer having a smaller thickness has been conducted.

Korean Patent Application Laid-Open No. 2010-0071998 discloses a method of manufacturing a thin polarizing plate by using a laminate manufactured by applying a hydrophilic polymer layer on a base material layer or co-extruding a base material layer forming material and a hydrophilic polymer layer forming material. However, in the case of the coating or co-extruding method, since it is not easy to separate a polyvinyl alcohol layer and the base material layer after stretching and high peel strength is required for separation, problems such as damage or deformation of the polyvinyl alcohol layer easily occur in a separation process, and as a result, an optical property such as the degree of polarization of the polyvinyl alcohol film is degraded. Further, in the case where the coating method or the co-extruding method is used, since the thin polarizing plate is manufactured by a method of melting a polyvinyl alcohol resin and then extruding the polyvinyl alcohol resin or manufacturing the polyvinyl alcohol resin in a coating liquid and then applying the polyvinyl alcohol resin, physical properties of the manufactured polyvinyl alcohol film are easily changed according to an extrusion condition, a coating condition, or a film manufacturing condition, and thus physical properties of the finally manufactured polyvinyl alcohol are degraded and it is difficult to implement uniform physical properties.

Accordingly, a thin polarizer having an excellent optical property needs to be manufactured.

DISCLOSURE

Technical Problem

The present invention has been made in an effort to provide a method of manufacturing a polarizer having an excellent optical property and a small thickness with excellent productivity.

Technical Solution

An exemplary embodiment of the present invention provides a method of manufacturing a thin polarizer, including: forming a film laminate by attaching a polyvinyl alcohol-based film to at least one surface of a polymer film by using attraction force or an adhesive; swelling the film laminate so that a degree of swelling of the polyvinyl alcohol-based film is 0.36 to 0.44; dyeing at least one of iodine and a dichromatic dye on the film laminate; and stretching the film laminate.

In this case, it is preferable that the swelling of the film laminate be performed to satisfy the following Equation (2) when a swelling tank retention time is t seconds.

$$0.36 \leq 0.105 \cdot t^{0.5} \leq 0.44 \qquad \text{Equation (2):}$$

Further, it is preferable that a thickness of the polyvinyl alcohol-based film be about 10 μm to 60 μm.

Meanwhile, the stretching may be performed at a stretching magnification of 5 times to 15 times, and the stretching may be performed at a temperature of 45° C. to 55° C. Preferably, the stretching may be performed in a boric acid aqueous solution having a boric acid concentration of 1 to 5%.

Meanwhile, the manufacturing method of the present invention may further include after the stretching, separating the polymer film and the polyvinyl alcohol-based film and/or drying the stretched film laminate.

Another exemplary embodiment of the present invention provides a polyvinyl alcohol-based thin polarizer manufactured by the aforementioned method and having a thickness of 10 μm or less, simple substance transmittance of 40% to 45%, and a degree of polarization of 99.9% or more, and a polarizing plate including the same.

Advantageous Effects

A thin polarizer manufactured according to a method of the present invention has excellent optical properties of

MODE FOR INVENTION

Figure 1:
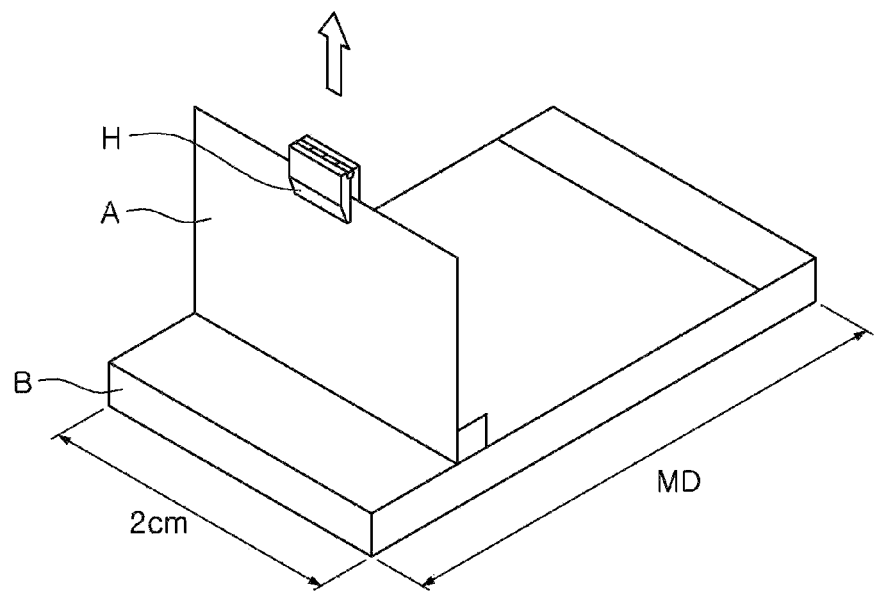
FIG. 1 is a schematic diagram illustrating a method of measuring peeling strength using a texture analyzer.

Hereinafter, the present invention will be more specifically described.

The present inventors have repeatedly studied over a long period of time in order to manufacture a polarizer having a very small thickness of 10 µm or less and an excellent optical property without occurrence of breakage in a manufacturing process, and found that when the thin polarizer is manufactured, the excellent optical property can be obtained by controlling the degree of swelling of a polyvinyl alcohol-based film in a special range, thereby accomplishing the present invention.

To be more specific, a method of manufacturing the thin polarizer according to the present invention includes forming a film laminate by attaching a polyvinyl alcohol-based film to at least one surface of a polymer film by using attraction force or an adhesive; swelling the film laminate so that the degree of swelling of the polyvinyl alcohol-based film is 0.36 to 0.44; dyeing at least one of iodine and a dichromatic dye on the film laminate; and stretching the film laminate.

Hereinafter, steps of the method of manufacturing the thin polarizer according to the present invention will be specifically described.

First, the polyvinyl alcohol-based film is attached to one surface or both surfaces of the polymer film to form the film laminate.

In this case, the polymer film is configured to prevent breakage of the polyvinyl alcohol-based film in a stretching process, and preferably, may be a polymer film having the maximum stretching magnification of 5 times or more under a temperature condition of 20° C. to 85° C. In this case, the maximum stretching magnification means a stretching magnification immediately before breakage occurs. Meanwhile, stretching may be dry stretching or wet stretching, and in the case of wet stretching, stretching magnification means the maximum stretching magnification in the case where stretching is performed in a boric acid aqueous solution having a boric acid concentration of 1.0 to 5 wt %.

Examples of the polymer film may include a high density polyethylene film, a polyurethane film, a polypropylene film, a polyolefin film, an ester-based film, a low density polyethylene film, high density polyethylene and low density polyethylene co-extrusion films, a copolymer resin film in which ethylene vinyl acetate is contained in high density polyethylene, an acryl film, a polyethylene terephthalate film, a polyvinyl alcohol-based film, a cellulose-based film, and the like, but are not limited thereto.

Next, the polyvinyl alcohol-based film may have the degree of polymerization of about 1,000 to 10,000 and preferably about 1,500 to 5,000, but is not limited thereto. This is because when the degree of polymerization satisfies the aforementioned range, movement of molecules is free and the polyvinyl alcohol-based film can be flexibly mixed with iodine or the dichromatic dye. As the polyvinyl alcohol-based film of the present invention, a polyvinyl alcohol-based film coming into the market may be used, and for example, P30, PE30, and PE60 manufactured by KURARAY CO., LTD., M3000 and M6000 manufactured by Nippon Gohsei Co., Ltd., and the like may be used. In this case, the polyvinyl alcohol-based film may be, if necessary, an unstretched film or a stretched film, and is not limited thereto.

Meanwhile, the thickness of the polyvinyl alcohol-based film may be about 10 to 60 µm and preferably about 10 to 40 µm. In the case where the thickness of the polyvinyl alcohol-based film is more than 60 µm, it is difficult to implement the thickness of 10 µm or less even though stretching is performed, and in the case where the thickness is less than 10 µm, breakage easily occurs during stretching.

Meanwhile, the polymer film and the polyvinyl alcohol-based film may be attached through the adhesive, or may be attached by weak attraction force generated on surfaces of the polymer film and the polyvinyl alcohol-based film without a separate medium. According to any method, attachment strength between the polymer film and the polyvinyl alcohol-based film is 2 N/2 cm or less and preferably about 0.1 to 1 N/2 cm. This is because in the case where attachment strength between the polymer film and the polyvinyl alcohol film satisfies the aforementioned range, the polymer film and the polyvinyl alcohol-based film are not separated in the stretching process and surface damage can be minimized in a separation process after stretching. In this case, attachment strength is attachment strength measured when the sample films having the length of 2 cm are attached, and a specific measurement method thereof is illustrated in FIG. 1. In the present invention, attachment strength between the films, as illustrated in FIG. 1, refers to peeling strength measured while force is applied in a direction that is vertical to a plane direction of the film laminate to peel a polyvinyl alcohol film A from a polymer film B after the polyvinyl alcohol film A of the film laminate is fixed by a sample holder H, and in this case, as measurement equipment, a texture analyzer (model name: TA-XT Plus) manufactured by Stable Micro Systems Ltd. is used.

Meanwhile, in the case where the polymer film and the polyvinyl alcohol-based film are attached by using weak attraction force, appropriate attachment strength may be ensured by performing surface treatment on one surface or both surfaces of the base material film or the polyvinyl alcohol-based film. In this case, the surface treatment may be performed through various surface treatment methods well known in the art, for example, corona treatment, plasma treatment, surface reforming treatment using an aqueous solution of a strong base such as NaOH or KOH, and the like.

It is preferable that in the case where the polymer film and the polyvinyl alcohol-based film are attached by using the adhesive, the thickness of the adhesive layer be about 20 to 4000 nm. When the thickness of the adhesive layer satisfies the aforementioned range, the thickness is useful in peeling of the polyvinyl alcohol-based film without damage after the stretching and drying processes.

Meanwhile, attachment strength (adhesion strength) of the adhesive may be 2 N/2 cm or less, a material thereof is not particularly limited, and various adhesives known in the art may be used without a limitation. For example, the adhesive layer may be formed of an aqueous adhesive or a UV-curable adhesive.

To be more specific, the adhesive layer may be formed by the aqueous adhesive including one kind or more selected from the group consisting of a polyvinyl alcohol-based resin, an acryl-based resin, and a vinyl acetate-based resin. Alternatively, the adhesive layer may be formed by the aqueous adhesive including a polyvinyl alcohol-based resin having an acryl group and a hydroxy group. In this case, the degree of polymerization of the polyvinyl alcohol-based resin having the acryl group and the hydroxy group may be about 500 to 1800. It is preferable that in the case where the aqueous adhesive is used, the thickness of the adhesive layer be about 20 to 1,000 nm.

Meanwhile, the adhesive layer may be formed of the UV-curable adhesive, and for example, may be formed of a UV-curable adhesive including a first epoxy compound where a glass transition temperature of a homopolymer is 120° C. or more, a second epoxy compound where a glass transition temperature of a homopolymer is 60° C. or less, and a cationic photopolymerization initiator. Specifically, the UV-curable adhesive may include 100 parts by weight of the first epoxy compound where the glass transition temperature of the homopolymer is 120° C. or more, 30 to 100 parts by weight of the second epoxy compound where the glass transition temperature of the homopolymer is 60° C. or less, and 0.5 to 20 parts by weight of the cationic photopolymerization initiator.

In the present specification, the epoxy compound means a compound having one or more epoxy groups in a molecule, is preferably a compound having two or more epoxy groups in the molecule, and is a concept including all types of monomer, polymer, or resin compounds. Preferably, the epoxy compound of the present invention may be a resin type.

Meanwhile, as the first epoxy compound, any epoxy compound may be used without a particular limitation as long as the epoxy compound is an epoxy compound where the glass transition temperature of the homopolymer is 120° C. or more, and for example, an alicyclic epoxy compound and/or aromatic epoxy where the glass transition temperature of the homopolymer is 120° C. or more may be used as the first epoxy compound of the present invention. Specific examples of the epoxy compound where the glass transition temperature of the homopolymer is 120° C. or more may include 3,4-epoxycyclohexylmethyl-3,4'-epoxycyclohexanecarboxylate, vinylcyclohexenedioxide dicyclopentadienedioxide, bisepoxycyclopentylether, a bisphenol A-based epoxy compound, a bisphenol F-based epoxy compound, and the like. Meanwhile, it is more preferable that in the first epoxy compound, the glass transition temperature of the homopolymer be about 120° C. to 200° C.

Next, as the second epoxy compound, any epoxy compound may be used without a particular limitation as long as the epoxy compound is an epoxy compound where the glass transition temperature of the homopolymer is 60° C. or less. For example, as the second epoxy compound, an alicyclic epoxy compound, an aliphatic epoxy compound, and the like may be used.

In this case, as the alicyclic epoxy compound, it is preferable to use a two-functional epoxy compound, that is, a compound having two epoxy groups, and it is more preferable to use a compound where both two epoxy groups are alicyclic epoxy groups, but the alicyclic epoxy compound is not limited thereto.

As the aliphatic epoxy compound, an epoxy compound having an aliphatic epoxy group rather than the alicyclic epoxy group may be exemplified. For example, polyglycidylether of aliphatic polyvalent alcohol; polyglycidylether of an alkylene oxide adduct of aliphatic polyvalent alcohol; polyglycidylether of aliphatic polyvalent alcohol and polyester polyol of aliphatic polyvalent carboxylic acid; polyglycidylether of aliphatic polyvalent carboxylic acid; polyglycidylether of aliphatic polyvalent alcohol and polyester polycarboxylic acid of aliphatic polyvalent carboxylic acid; dimers, oligomers, or polymers obtained by vinyl polymerization of glycidyl acrylate or glycidyl methacrylate; or oligomers or polymers obtained by vinyl polymerization of glycidyl acrylate or glycidyl methacrylate and other vinyl-based monomers may be exemplified, and preferably, polyglycidylether of aliphatic polyvalent alcohol or the alkylene oxide adduct thereof may be used, but the aliphatic epoxy compound is not limited thereto.

As aliphatic polyvalent alcohol, for example, aliphatic polyvalent alcohol having 2 to 20 carbon atoms, 2 to 16 carbon atoms, 2 to 12 carbon atoms, 2 to 8 carbon atoms, or 2 to 4 carbon atoms may be exemplified, and for example, aliphatic diol such as ethyleneglycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; alicyclic diol such as cyclohexanedimethanol, cyclohexanediol, hydrogen-added bisphenol A, and hydrogen-added bisphenol F; trimethylolethane, trimethylolpropane, hexitols, pentitols, glycerine, polyglycerine, pentaerythritol, dipentaerythritol, tetramethylolpropane, and the like may be exemplified.

Further, in the above, as alkylene oxide, alkylene oxide having 1 to 20 carbon atoms, 1 to 16 carbon atoms, 1 to 12 carbon atoms, 1 to 8 carbon atoms, or 1 to 4 carbon atoms may be exemplified, and for example, ethylene oxide, propylene oxide, butylene oxide, or the like may be used.

Further, as aliphatic polyvalent carboxylic acid, for example, oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylmethylenecyclohexane, 1,2,3-propanetricarboxylic acid, 1,2,3,4-butanetetracarboxylic acid, 1,2,3,4-cyclobutanetetracarboxylic acid, and the like may be exemplified, but aliphatic polyvalent carboxylic acid is not limited thereto.

Preferably, the second epoxy compound of the present invention may include one or more glycidyl ether groups, and for example, one kind or more selected from the group consisting of 1,4-cyclohexanedimethanol diglycidyl ether, 1,4-butanedioldiglycidylether, 1,6-hexanedioldiglycidylether, neopentyldiglycidylether, resorcinoldiglycidylether, diethyleneglycoldiglycidylether, ethyleneglycoldiglycidylether, trimethylolpropanetriglycidylether, n-butyl glycidyl ether, 2-ethylhexyl glycidyl ether, phenyl glycidyl ether, and o-cresyl glycidyl ether may be used as the second epoxy compound of the present invention.

Meanwhile, it is more preferable that in the second epoxy compound, the glass transition temperature of the homopolymer be about 0° C. to 60° C.

Meanwhile, in the case of the present invention, it is particularly preferable to use a combination of the first epoxy compound including one or more epoxylated aliphatic cyclic groups and the second epoxy compound including one or more glycidylether groups as the epoxy compound, but the epoxy compound is not limited thereto.

Meanwhile, it is preferable that in the case where the UV-curable adhesive is used, the thickness of the adhesive layer be about 20 to 4,000 nm.

If the film laminate is formed by the aforementioned method, the film laminate is swollen. In this case, swelling, for example, may be performed by a method of immersing the film laminate in water at 15° C. to 35° C. In this case, swelling is performed so that the degree of swelling of the polyvinyl alcohol-based film is 0.36 to 0.44. Herein, the degree of swelling means a value calculated by the following Equation (1).

Degree of swelling={(weight of polyvinyl alcohol-based film after swelling−weight of polyvinyl alcohol-based film before swelling)}/(weight of polyvinyl alcohol-based film before swelling)  Equation (1):

According to research of the present inventors, in the case of an ultra-thin PVA polarizer having a thickness of 10 μm or less, it is shown that an optical property such as the degree of polarization is largely affected by the degree of swelling, and in order to exhibit the degree of polarization of 99.9% or more, the degree of swelling should satisfy the numerical range of 0.36 to 0.44.

Meanwhile, the degree of swelling of the polyvinyl alcohol-based film may be adjusted by a method of adjusting the swelling tank retention time. To be more specific, in the present invention, it is preferable that the step of swelling the film laminate be performed so as to satisfy the following Equation (2) when the swelling tank retention time is t seconds.

$$0.36 \leq 0.105 \cdot t^{0.5} \leq 0.44 \quad \text{Equation (2):}$$

After the swelling step is performed, at least one of iodine and the dichromatic dye is dyed on the film laminate. In this case, dyeing may be performed by immersing the film laminate in the aqueous solution including iodine and/or the dichromatic dye. In this case, a concentration of iodine in the aqueous solution may be about 0.02 wt % to 0.5 wt % and preferably 0.05 wt % to 0.3 wt %, but is not limited thereto. Further, a temperature of the dyeing step may be about 20° C. to 50° C. and preferably about 25° C. to 35° C. In the case where the dyeing temperature deviates from the aforementioned numerical range, the degree of diffusion of iodine ions into polyvinyl alcohol is reduced to decrease dyeing efficiency, and if the temperature is excessively high, a sublimation property of iodine is increased to increase a loss of iodine. Meanwhile, a dyeing time may be about 30 seconds to 90 seconds, but is not limited thereto.

Meanwhile, after the dyeing step, if necessary, a cross-linking step of cross-linking iodine and/or the dichromatic dye with the polyvinyl alcohol-based film may be further performed, and in this case, the cross-linking step, for example, may be performed by a method of immersing the film laminate in a boric acid aqueous solution.

Further, if necessary, after the dyeing step, a process of washing the film laminate may be further performed. In this case, the washing process may be performed in the boric acid aqueous solution, and more specifically, is preferably performed in the boric acid aqueous solution having a boric acid concentration of about 0.1 to 2.5 wt % and preferably about 0.5 to 2.0 wt %, but is not limited thereto.

Next, the film laminate is stretched. In this case, it is preferable that stretching be performed so that the thickness of the polyvinyl alcohol-based film is 10 μm or less, and for example, it is preferable that stretching be performed so that the thickness of the polyvinyl alcohol-based film be about 1 μm to 10 μm, 3 μm to 10 μm, or 1 μm to 5 μm.

Meanwhile, in the present invention, a stretching condition is not particularly limited, but for example, stretching may be performed at a temperature of 20° C. to 85° C. at a stretching magnification of 5 times to 15 times, and more preferably, may be performed at the temperature of 40° C. to 80° C. at the stretching magnification of 5 times to 12 times.

In this case, stretching may be performed by wet stretching or dry stretching. However, in the case where wet stretching is performed, as compared to dry stretching, wet stretching is more preferable in that since surface attachment strength between a thermosetting polyurethane film and the polyvinyl alcohol-based film becomes strong, stretching can be stably performed without a separate adhesion unit. Meanwhile, it is preferable that wet stretching be performed in the boric acid aqueous solution, and in this case, it is preferable that the boric acid concentration of the boric acid aqueous solution be about 1.0 to 5.0 wt %.

In the case where stretching is performed in the boric acid aqueous solution, an occurrence ratio of breakage of the polyvinyl alcohol-based film may be reduced due to cross-linking of the boric acid to increase process stability and control formation of wrinkles of the PVA film, which are easily formed during the wet process. Further, stretching is feasible even at low temperatures as compared to dry stretching.

Meanwhile, the stretching step may be performed together with at least one step of the step of dyeing the polyvinyl alcohol-based film with iodine and/or the dichromatic dye, and/or the step of cross-linking the dyed iodine and/or dichromatic dye with the polyvinyl alcohol-based film.

For example, the dyeing, cross-linking, and stretching processes may be simultaneously performed by performing stretching in the aqueous solution including iodine and/or the dichromatic dye and boric acid. Alternatively, the cross-linking step and the stretching step may be performed together by, before the stretching step, immersing the film laminate in the aqueous solution including iodine and/or the dichromatic dye to perform the dyeing step, immersing the dyed film laminate in the boric acid aqueous solution, and performing stretching in the boric acid aqueous solution.

Meanwhile, as described above, after the film laminate is stretched, if necessary, a step of drying the stretched film laminate may be further included. In this case, a drying temperature may be 20° C. to 100° C. and more preferably about 40° C. to 90° C., and it is preferable that drying be performed at the aforementioned temperature for 1 minute to 10 minutes. A drying process serves to prevent a reduction in physical properties of the PVA polarizer due to moisture during the process of manufacturing the polarizing plate by removing moisture on a surface and in an inside of PVA and smoothly induce a reduction in width of the polyvinyl alcohol film stretched in the drying process and thus increase an alignment property of a complex constituted by polyvinyl alcohol and iodine, thereby improving the degree of polarization of the polarizer.

Meanwhile, if the stretching step is finished, a step of separating the polymer film and the polyvinyl alcohol-based film of the stretched film laminate may be performed. In the present invention, the separation step may be performed by a method of applying weak peeling strength to the polyvinyl alcohol-based film to separate the polyvinyl alcohol-based film from the polymer film. In this case, it is preferable that peeling strength be 2 N/2 cm or less, and for example, peeling strength may be about 0.1 to 2 N/2 cm or 0.1 to 1 N/2 cm.

As described above, in the present invention, as compared to the case where lamination is performed by using coating or co-extrusion, since peeling strength required to separate the polyvinyl alcohol-based film and the polymer film is very weak, the two films may be easily separated without a separate process or equipment, and moreover, the polyvinyl alcohol-based film in the separation process is less damaged, and thus an excellent optical property is exhibited.

The polarizer of the present invention manufactured by the aforementioned method is very thin enough so that the thickness is 10 µm or less, preferably about 1 µm to 10 µm, and more preferably about 3 µm to 10 µm. Further, even in the aforementioned small thickness, simple substance transmittance is about 40% to 45% and the degree of polarization is 99.9% or more, and thus an excellent optical property is exhibited.

Meanwhile, a transparent film may be laminated on one surface or both surface of the polarizer of the present invention to form the polarizing plate. In this case, as the transparent film, various films used as a polarizer protection film or a phase difference film in the art may be used without a limitation, and for example, an acryl-based film, a PET film, a PET film treated by an acryl-based primer, a cellulose-based film, a cycloolefin-based film, a polycarbonate-based film, a polynorbornene-based film, and the like may be used.

A lamination method of the polarizer and the transparent film is not particularly limited, and may be performed by using an adhesive, a tackifier, or the like well known in the art. In this case, the tackifier or the adhesive may be appropriately selected in consideration of a material of the used transparent film and the like, and for example, in the case where TAC is used as the transparent film, an aqueous adhesive such as a polyvinyl alcohol-based adhesive may be used, and in the case where an acryl film, a COP film, or the like is used as the transparent film, a photo-curable or heat-curable adhesive such as an acryl-based adhesive and an epoxy-based adhesive may be used.

Hereinafter, the present invention will be described in more detail through the specific Examples.

EXAMPLE

The polyvinyl alcohol film (Nippon Gohsei Co., Ltd., M2000 grade) having the thickness of 20 µm was attached to both surfaces of the polyurethane film having the thickness of 40 µm to manufacture the film laminate. Next, the film laminate was swollen in the pure solution at 25° C. for 15 seconds, and then subjected to the dyeing process in the iodine solution having the concentration of 0.3 wt % at 25° C. for 60 seconds. Next, the film laminate was washed in 1 wt % of the boric acid solution for 15 seconds, and then subjected to the six time stretching process in 2 wt % of the boric acid solution at 50° C. After stretching, the film laminate was subjected to the complementary color process in 5 wt % of the KI solution, and then subjected to the drying process in the oven at 80° C. for 5 minutes. Next, the polyurethane film and the polyvinyl alcohol film were separated to finally manufacture the thin polarizer having the thickness of 5.6 µm.

Comparative Example 1

The thin polarizer having the thickness of 5.8 µm was manufactured by the same method as the Example, except that the swelling process was performed for 10 seconds.

Comparative Example 2

The thin polarizer having the thickness of 5.4 µm was manufactured by the same method as the Example, except that the swelling process was performed for 20 seconds.

Comparative Example 3

The polarizer was manufactured by the same method as the Example, except that the swelling process was excluded and the dyeing process was directly performed.

Experimental Example 1

Optical properties such as the swelling ratio, simple substance transmittance, the degree of polarization, the simple substance color, and the orthogonal color of the thin polarizers manufactured by the Example and Comparative Examples 1 and 2 were measured by JASCO V-7100 spectrophotometer. The measurement results are described in [Table 1].

TABLE 1

| Classification | Degree of swelling (%) | Simple substance transmittance (Ts, %) | Degree of polarization (DOP, %) | Simple substance color | | Orthogonal color | |
|---|---|---|---|---|---|---|---|
| | | | | a | b | a | b |
| Example | 40.9 | 43.0 | 99.9172 | −0.79 | 2.12 | 0.52 | −3.05 |
| Comparative Example 1 | 35.8 | 43.0 | 99.8814 | −0.85 | 2.09 | 0.54 | −3.28 |
| Comparative Example 2 | 46.2 | 43.0 | 99.7842 | −0.88 | 1.87 | 0.45 | −3.88 |
| Comparative Example 3 | X | Occurrence of breakage during stretching process | | | | | |

Experimental Example 2

Figure 2:
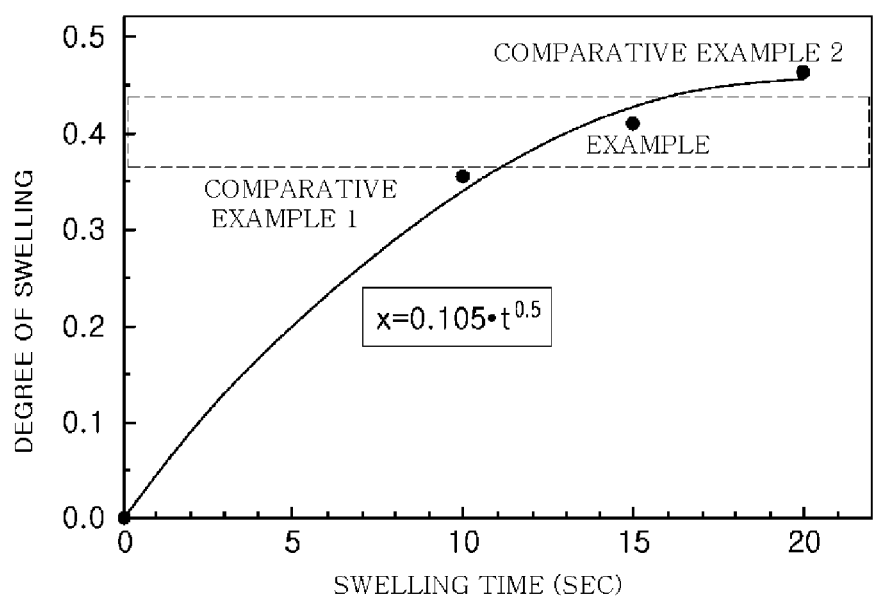
FIG. 2 is a graph illustrating the degree of swelling according to a swelling tank retention time.

The polyvinyl alcohol film (Nippon Gohsei Co., Ltd., M2000 grade) having the thickness of 20 µm was attached to both surfaces of the polyurethane film having the thickness of 40 µm to manufacture the film laminate. Next, the degree of swelling of the film laminate in the pure solution at 25° C. was measured while the retention time was changed to calculate the degree of swelling of the polyvinyl alcohol-based film according to the swelling tank retention time. The result is illustrated in FIG. 2. As illustrated in the graph of FIG. 2, it can be seen that when the degree of swelling is x and the swelling tank retention time is t seconds, the relational equation such as the following Equation (3) is established.

$$x = 0.105 \cdot t^{0.5} \qquad \text{Equation (3):}$$

Figure 3:
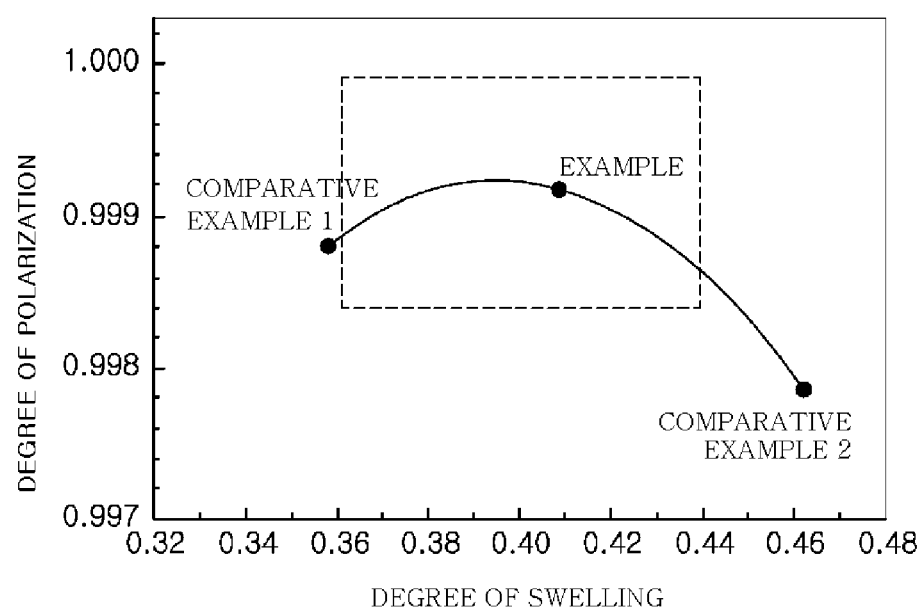
FIG. 3 is a graph illustrating the degree of polarization of thin polarizers manufactured by Examples and Comparative Examples 1 and 2.

Further, after the swollen film laminate was subjected to dyeing, washing, stretching, correcting, and drying by the same method as Example 1 to manufacture the thin polarizer, the degree of polarization thereof was measured, and on the basis of the measured degree of polarization, the value of the degree of polarization according to the degree of swelling of the polyvinyl alcohol-based film was calculated. The result is illustrated in FIG. 3. Through the graph of FIG. 3, it can be seen that in order to obtain the degree of polarization of 99.9% or more, the degree of swelling of the polyvinyl alcohol-based film needs to satisfy the range of 0.36 to 0.44.

DESCRIPTION OF REFERENCE NUMERALS

H: Holder
A: Polyvinyl alcohol-based film
B: Polymer film
MD: Longitudinal stretching direction

The invention claimed is:

1. A method of manufacturing a thin polarizer, comprising:
   providing a prefabricated polyvinyl alcohol-based film;
   providing a polymer film;
   forming a film laminate by attaching the prefabricated polyvinyl alcohol-based film to at least one surface of the polymer film by using attraction force or an adhesive;
   swelling the film laminate so that a degree of swelling of the polyvinyl alcohol-based film is 0.36 to 0.44;
   dyeing at least one of iodine and a dichromatic dye on the film laminate; and
   stretching the film laminate,
   wherein the swelling of the film laminate is performed by a method of immersing the film laminate in water at 15° C. to 35° C., and
   wherein the swelling of the film laminate is performed to satisfy the following Equation (2) when a swelling tank retention time is t seconds:

$$0.36 \leq 0.105 \cdot t^{0.5} \leq 0.44 \qquad \text{Equation (2).}$$

2. The method of manufacturing a thin polarizer of claim 1, wherein a thickness of the prefabricated polyvinyl alcohol-based film before attaching to the polymer film is 10 μm to 60 μm.

3. The method of manufacturing a thin polarizer of claim 1, wherein the stretching is performed at a stretching magnification of 5 times to 15 times.

4. The method of manufacturing a thin polarizer of claim 1, wherein the stretching is performed at a temperature of 45° C. to 55° C.

5. The method of manufacturing a thin polarizer of claim 1, wherein the stretching is performed in a boric acid aqueous solution having a boric acid concentration of 1 to 5%.

6. The method of manufacturing a thin polarizer of claim 1, further comprising:
   after the stretching, separating the polymer film and the polyvinyl alcohol-based film.

7. The method of manufacturing a thin polarizer of claim 1, further comprising:
   after the stretching, drying the stretched film laminate.

8. A polyvinyl alcohol-based thin polarizer manufactured by the manufacturing method of claim 1 and having a thickness of 10 μm or less, simple substance transmittance of 40% to 45%, and a degree of polarization of 99.9% or more.

9. A polarizing plate comprising:
   the polyvinyl alcohol-based thin polarizer of claim 8.

* * * * *